US009418658B1

(12) United States Patent
David et al.

(10) Patent No.: US 9,418,658 B1
(45) Date of Patent: Aug. 16, 2016

(54) CONFIGURATION OF VOICE CONTROLLED ASSISTANT

(75) Inventors: Tony David, San Jose, CA (US); Parag Garg, Woodinville, WA (US)

(73) Assignee: Amazon Technologies, Inc., Seattle, WA (US)

( * ) Notice: Subject to any disclaimer, the term of this patent is extended or adjusted under 35 U.S.C. 154(b) by 937 days.

(21) Appl. No.: 13/368,921

(22) Filed: Feb. 8, 2012

(51) Int. Cl.
*G10L 21/00* (2013.01)
*H04M 1/64* (2006.01)
*G10L 15/26* (2006.01)

(52) U.S. Cl.
CPC . *G10L 15/26* (2013.01); *H04M 1/64* (2013.01)

(58) Field of Classification Search
USPC .......................................................... 704/270
See application file for complete search history.

(56) References Cited

U.S. PATENT DOCUMENTS

| 6,118,986 | A   | * | 9/2000  | Harris ................. | H04M 1/0214 |
|-----------|-----|---|---------|------------------------|-------------|
|           |     |   |         |                        | 235/441     |
| 7,194,069 | B1  | * | 3/2007  | Jones ..................... | H04M 3/493  |
|           |     |   |         |                        | 379/210.01  |
| 7,418,392 | B1  |   | 8/2008  | Mozer et al.           |             |
| 7,720,683 | B1  |   | 5/2010  | Vermeulen et al.       |             |
| 7,774,204 | B2  |   | 8/2010  | Mozer et al.           |             |
| 2004/0062412 | A1 | * | 4/2004  | Nassimi ............... | H04R 1/1058 |
|           |     |   |         |                        | 381/380     |
| 2004/0220812 | A1 | * | 11/2004 | Bellomo ................. | G10L 21/06  |
|           |     |   |         |                        | 704/275     |
| 2006/0018481 | A1 | * | 1/2006  | Nagano ................. | H04L 9/3271 |
|           |     |   |         |                        | 380/270     |
| 2006/0100879 | A1 | * | 5/2006  | Jakobsen ............... | H04M 1/271  |
|           |     |   |         |                        | 704/270     |
| 2007/0055517 | A1 | * | 3/2007  | Spector .................... | G06F 21/32  |
|           |     |   |         |                        | 704/246     |
| 2007/0207767 | A1 | * | 9/2007  | Reuss ................. | H04M 1/6066 |
|           |     |   |         |                        | 455/403     |
| 2012/0223885 | A1 |   | 9/2012  | Perez                  |             |
| 2013/0197918 | A1 | * | 8/2013  | Ansell ..................... | G10L 19/00  |
|           |     |   |         |                        | 704/500     |

FOREIGN PATENT DOCUMENTS

WO        WO2011088053        7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

* cited by examiner

*Primary Examiner* — Timothy Nguyen (74) *Attorney, Agent, or Firm* — Lee & Hayes, PLLC (57) ABSTRACT

A voice interaction architecture has a hands-free, electronic voice controlled assistant that permits users to verbally request information from cloud services. Since the assistant relies primarily, if not exclusively, on voice interactions, configuring the assistant for the first time may pose a challenge, particularly to a novice user who is unfamiliar with network settings (such as wife access keys). The architecture supports several approaches to configuring the voice controlled assistant that may be accomplished without much or any user input, thereby promoting a positive out-of-box experience for the user. More particularly, these approaches involve use of audible or optical signals to configure the voice controlled assistant.

20 Claims, 10 Drawing Sheets

CONFIGURATION OF VOICE CONTROLLED ASSISTANT

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through speech.

With each evolution, users are often faced with a new device that may be unfamiliar. Further, to function properly, some devices require an initial configuration that might involve setting up the device to connect seamlessly to a network, such as a wife network. The user's general unfamiliarity with a new product and perhaps lack of knowledge about basic configuration details may cause the user to have a poor "out-of-box" experience because the product seemingly does not start working when first powered on.

Accordingly, there is a need for techniques to improve "out-of-box" experiences during configuration of a new device, particularly for devices where the primary user interaction is through audio exchanges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 1 shows a first implementation for configuring the voice controlled assistant.

DETAILED DESCRIPTION

An architecture in which wireless LAN (WLAN) devices can be configured using audible or optical signals is described. The architecture is described in the context of a particular architecture in which users can request and receive information from a network accessible computing platform, or "cloud service", through a hands-free, electronic voice controlled assistant equipped with a WLAN interface. The voice controlled assistant may be positioned in a room (e.g., at home, work, store, etc.) to receive user input in the form of voice interactions, such as spoken requests or a conversational dialogue. The voice input may be transmitted from the assistant over a network to the cloud service. The cloud service interprets the voice input and uses the voice input to perform a function. In the event that the function creates a response, the cloud service transmits the response back over the network to the assistant.

Since the assistant relies primarily, if not exclusively, on voice interactions, configuring the assistant for the first time may pose a challenge, particularly to a novice user who is unfamiliar with network settings (such as wife access keys). Accordingly, the architecture described herein supports several approaches to configuring the voice controlled assistant that may be accomplished without much user input, thereby promoting a positive out-of-box experience for the user. One approach engages the user in a dialogue, and walks him or her through the setup process. Another approach involves having the user communicate with a customer service representative, who remotely configures the device using a program that sends pre-defined digital tones or other recognizable sounds to a client device. The client device audibly emits the tones or sounds for capture by the voice controlled assistant and for use in its configuration. Still another approach involves using a user-side computing device, independent of the assistant, which allows a user to enter certain information that can be processed at a remote site. Based on the information, the site creates a set of tones or sounds that can be played back audibly through the computing device for use in configuring the voice controlled assistant. Further, in each of these scenarios, the assistant is configured using audible sounds. In other implementations, optical configuration signals are used to configure the voice controlled assistant.

The architecture may be implemented in many ways. Several implementations are described below, in which the voice controlled assistant is removed from its packaging for the first time and configured using the various approaches. However, the architecture may be implemented in many other contexts and situations in which the voice interacting devices are configured.

Illustrative Environment and Configuration Scenarios

Figure 1:
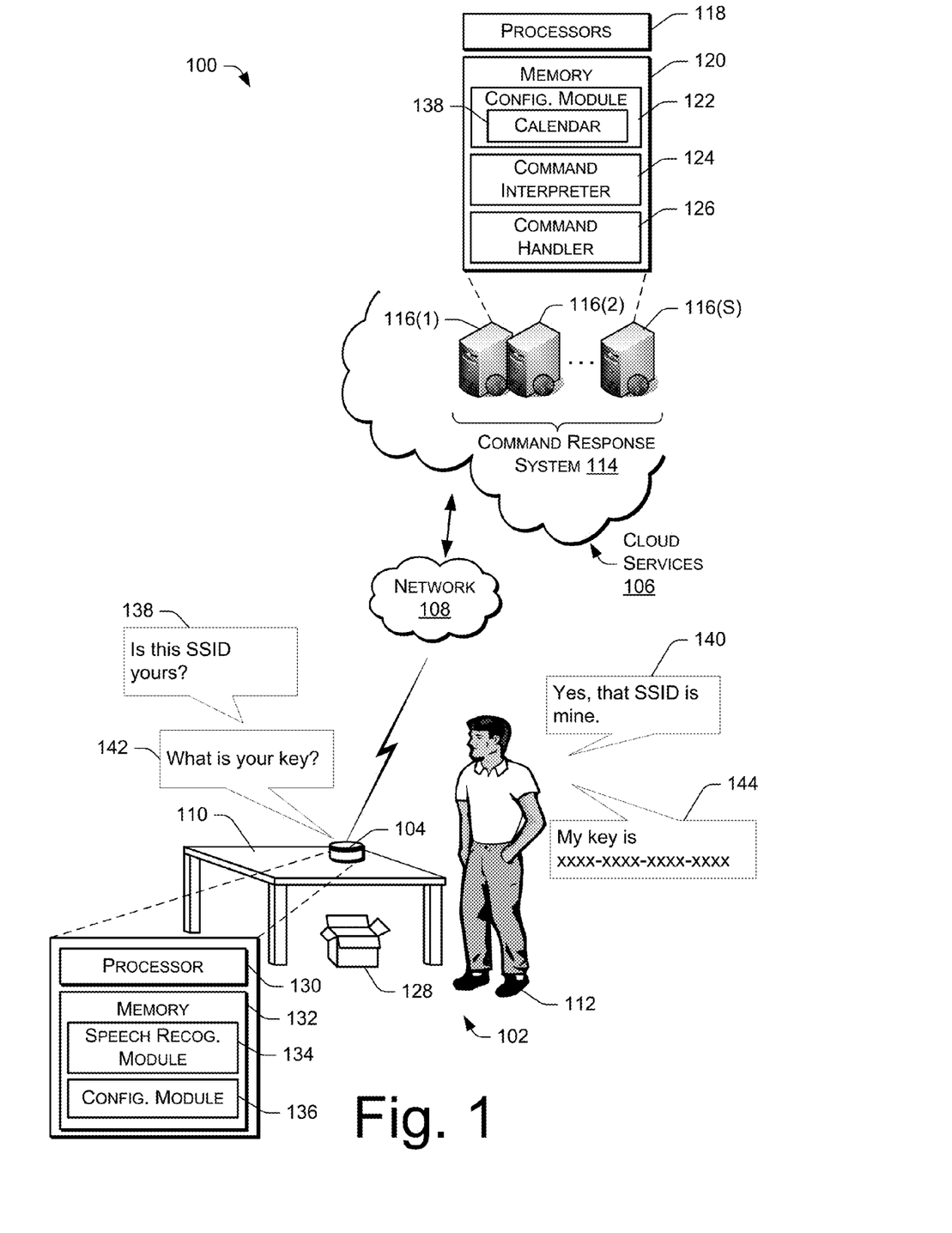
FIG. 1 shows an illustrative voice interaction computing architecture that includes a voice controlled assistant physically situated in a user environment that is communicatively coupled to remote cloud services accessible via a network.

FIG. 1 shows a first illustrative voice interaction computing architecture 100 set in an exemplary home environment 102. The architecture 100 includes an electronic voice controlled assistant 104 physically situated within a room of the home 102 and communicatively coupled to cloud services 106 over a network 108. In the illustrated implementation, the voice controlled assistant 104 is positioned on a table 110 within the home 102. In other implementations, it may be placed in any number of locations (e.g., ceiling, wall, in a lamp, beneath a table, under a chair, etc.). Further, more than one assistant 104 may be positioned in a single room, or one assistant may be used to accommodate user interactions from more than one room. Also, a room in a home is merely an example environment, as other settings such as an office or public location may be alternatively suitable.

Generally, the voice controlled assistant 104 has a microphone and speaker to facilitate audio interactions with a user 112. The voice controlled assistant 104 is implemented without an input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic assistant 104 is through voice input and audible output. One example implementation of the voice controlled assistant 104 is provided below in more detail with reference to FIG. 4.

The architecture 100 supports various approaches to configuring the voice controlled assistant 104. However, prior to describing these approaches, a general overview of the architecture and operation of the voice controlled assistant, after configuration, will be provided. Once the assistant is configured, its microphone detects words and sounds uttered from the user 112. The user may speak predefined commands (e.g., "Awake"; "Sleep"), or use a more casual conversation style when interacting with the assistant 104 (e.g., "I'd like to go to a movie. Please tell me what's playing at the local cinema."). The voice controlled assistant receives the user's vocal input, and transmits it over the network 108 to the cloud services 106.

The voice controlled assistant 104 may be communicatively coupled to the network 108 via wired technologies (e.g., wires, USB, fiber optic cable, etc.), wireless technologies (e.g., RF, cellular, satellite, Bluetooth, etc.), or other connection technologies. The network 108 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The network 108 carries data, such as audio data, between the cloud services 106 and the voice controlled assistant 104.

The cloud services 106 interprets the vocal input received from the assistant 104 to form an operational request or command, which can then be processed. The request may be for essentially any type of operation that can be performed by cloud services, such as database inquires, requesting and consuming entertainment (e.g., gaming, finding and playing music, movies or other content, etc.), personal management (e.g., calendaring, note taking, etc.), online shopping, financial transactions, and so forth.

The cloud services 106 generally refer to a network accessible platform implemented as a computing infrastructure of processors, storage, software, data access, and so forth that is maintained and accessible via a network such as the Internet. Cloud services 106 do not require end-user knowledge of the physical location and configuration of the system that delivers the services. Common expressions associated with cloud services include "on-demand computing", "software as a service (SaaS)", "platform computing", "network accessible platform", and so forth.

The cloud services 106 include a command response system 114 that processes user commands received from the voice controlled assistant 104 and may generate responses to return to the user. The command response system 114 is implemented by one or more servers, such as servers 116(1), 116(2), . . . , 116(S). These servers 116(1)-(S) may be arranged in any number of ways, such as server farms, stacks, and the like that are commonly used in data centers. The servers 116(1)-(S) have computing resources of processors 118 and memory 120 to store and execute any number of applications that can process the user input received from the voice controlled assistant 104, and produce a suitable response. The memory 120 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

A few example functional modules are shown as applications stored in the memory 120 and executed on the processors 118, although the same functionality may alternatively be implemented in firmware or as a system on a chip (SOC). The functional modules include a configuration module 122, a command interpreter 124, and a command handler 126.

The configuration module 122 is an application used in configuration of the voice controlled assistant 104. If the user recalls the configuration settings (e.g., SSID and/or access key), the configuration module 122 assists the command handler 126 to provide any information to the assistant 104. The configuration module 122 may further tracks the voice controlled assistants 104 over time to make sure the assistants, following delivery, are ultimately configured and registered at the command response system 114.

The command interpreter 124 interprets the user command to derive an intention of the user. This may be done in any number of ways. In one approach, the user command may be matched to a predefined response. In another approach, the user command may be converted from audio to a text string using a speech-to-text converter. In this text form, the user command can be used in search queries, or to reference associated responses, or to direct an operation, or to be processed further using natural language processing techniques, or so forth. In other implementations, the user command may be maintained in audio form, or be interpreted into other data forms.

Once interpreted, the user command is passed to a command handler 126, which performs essentially any operation that might accept the user command as an input. As one example, a text form of the user command may be used as a search query to search one or more databases. Alternatively, an audio command may be compared to a command database to determine whether it matches a pre-defined command. If so, the associated action or response may be retrieved. In yet another example, the handler 126 may use a converted text version of the user command as an input to a third party provider for conducting an operation, such as a financial transaction, an online commerce transaction, and the like.

Any one of these many varied operations may produce a response. The cloud services 106 returns the response to the user's verbal request by transmitting it back over the network 108 to the voice controlled assistant 104. The response is converted to audio data that can be audibly emitted from the speaker of the assistant 104 to the user.

Prior to supporting this voice controlled interaction with the cloud services 106, the voice controlled assistant 104 is first configured to communicate with the network 108. FIG. 1 shows a first implementation for configuring the voice controlled assistant 104, in which the user 112 knows the configuration settings and speaks them to the assistant 104. For discussion purposes, suppose that the voice controlled assistant 104 is initially removed from its packaging 128 and placed on a surface for configuration, such as the table 110. The voice controlled assistant 104 has one or more microphones, one or more speakers, a processor 130, and a memory 132. The assistant 104 is shown implemented with a speech recognition module 134 and a configuration module 136 that have sufficient functionality to facilitate configuration when the user knows the configuration settings. That is, the speech recognition module can interpret user commands, phrases and short conversational statements spoken by the user through the use of language models, lexicons, acoustic models, and the like. A more detailed explanation of the assistant 104 is described below with reference to FIG. 5.

After the assistant 104 is removed from the packaging 128 and turned on, the configuration module 136 emits a greeting (e.g., "Hello" or "Hi, I'm starting the configuration process") and begins scanning for wireless local area networks (WLANs). Each WLAN is assigned a service set identifier, or SSID, which allows all connected wireless devices to communicate with one another. Many WLANs are based on the IEEE standard, 802.11, and are commonly referred to by the brand name "Wi-Fi" networks, or simply "wifi". Wifi networks may be public or private. A public wifi network may be discovered through standard protocols to enable simple and quick access to the web. A private network has some security measures to limit access, such as an access key.

When the voice controlled assistant 104 identifies one or more wifi networks, the assistant 104 asks the user 112 whether he recognizes any of the SSID(s), as represented by a dialogue bubble 138. If the user happens to recognize the SSID, he may affirm that the SSID is familiar, as represented by a dialogue bubble 140. If the wifi network is private, the voice controlled assistant 104 may then request the access key, as represented by a dialogue bubble 142. If the user knows the key (by memory, or looking it up), the user may simply speak the number to the assistant 104, as shown by the dialogue bubble 144. For both the SSID and the access key, the user may speak each character (e.g., number and/or letter) with clarity and the speech recognition module 136 of the voice controlled assistant 104 is implemented with sufficient capabilities to recognize, interpret, and understand the characters. The assistant 104 may restate the SSID and/or access key for the user 112 to confirm accuracy. If accurate, the assistant 104 can store the configuration settings, including the access key for use in secure access to the wifi network, in the configuration module 134.

Once the assistant 104 can access the wife network, the assistant 104 can communicate with the cloud services 106. The voice controlled assistant 104 is automatically registered with the command response system 114, and the configuration parameters are also maintained by the configuration module 122. From that point forward, the voice controlled assistant 104 may be used to facilitate user speech interaction with the cloud servers 106.

In one implementation, the configuration module 122 may include a calendar application 138 that records when the voice controlled assistant is delivered to a user or intended destination (e.g., date/time of delivery). The calendar application 138 then sets a predetermined time period (or sets a date/time in the calendar) within which it expects to have the assistant configured and registered. The application 138 tracks time lapse after delivery and if the time lapse exceeds the time period (or arrives at the calendared event), the calendar application 138 generates a notice to initiate contact of the user (e.g., via email, text, phone call, etc.).

In many situations, however, it is anticipated that the user 112 will be unable to identify an SSID or recall an access key. Or, the user 112 may simply not feel comfortable installing a new device, but instead would prefer talking to a customer service representative.

Figure 2:
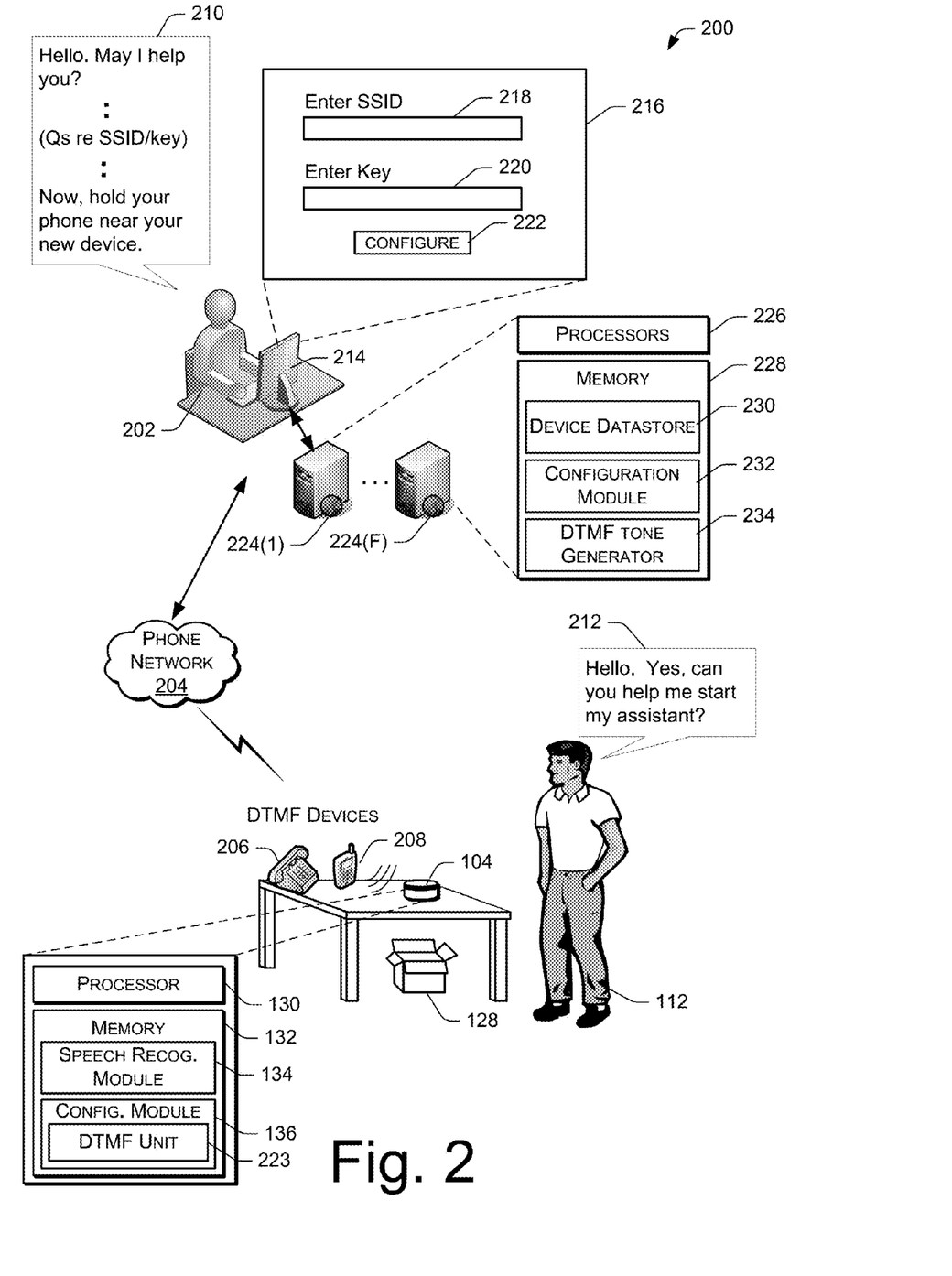
FIG. 2 shows a second implementation for configuring the voice controlled assistant.

FIG. 2 shows a second implementation 200 for configuring the voice controlled assistant 104, which involves working with a customer service representative 202. Like above, suppose that the voice controlled assistant 104 is initially removed from its packaging 128 and placed on a surface for configuration, such as the table 110. Unlike the previous scenario in FIG. 1, however, the user is unable to respond to the questions from the assistant 104, or perhaps is just generally unsure how to move forward, and thus decides to contact the customer service representative 202 over a phone network 204 (or VoIP network). The user 112 may use a landline phone 206, a portable cellular phone 208, or any other sort of communication device to contact the representative 202. The communication devices support dual-tone multi-frequency signaling (DTMF), which may also be referred to as "touch-tone" in tone dialing for push-button phones.

When connected, the customer service representative 202 begins a session with the user 112 with a greeting, as represented by the dialogue bubble 210 (e.g., "Hello. May I help you?"). The user replies with a greeting and requests help in configuring the assistant 104, as represented by the dialogue bubble 212 (e.g., "Hello. Yes, can you help me start my assistant?"). In response, the customer service representative 202 engages in the dialogue and begins to ask questions about the user's wife network (dialogue bubble 210).

In one scenario, the customer service representative 202 may ask for the SSID and/or the access key. If the user 112 knows the answers, he can simply give them to the representative. The customer service representative 202 may use a computer 214 to step through the configuration process. In one implementation, the computer 214 presents a user interface (UI) 216 that guides the representative through a series of questions. As a very simple example, the illustrated UI 216 prompts the representative 202 to ask for the SSID and access key. If the user 112 can provide this data over the phone, the representative 202 enters an SSID in an SSID entry field 218 and an access key in a key entry field 220. Once entered, the representative 202 informs the user 112 to place the DTMF device (i.e., phone 206 or cell phone 208) in close proximity to the voice controlled assistant 104 so that sound emitted from a DTMF device can be picked up by the microphone of the assistant. The representative 202 may then initiate the configuration process by actuating a "configure" soft button 222 in UI 216.

The computer 214 generates tones that are transmitted over the network 204 to a DTMF device 206/208, which then audibly outputs the tones to the assistant 104. The tones encode a sequence of information, including the SSID and the access key of the user's wifi access device, which is received at the voice controlled assistant 104. The configuration module 136 of the assistant 104 includes a DTMF decoder unit 223 to decipher the tones, extract the SSID and access key (among other information), and store these values. In this manner, the voice controlled assistant 104 that is primarily, if not exclusively, limited to audio interactions, may be remotely configured through use of audibly emitted instructions.

In another scenario, the user may not know the SSID and/or access key. The customer service representative 202 walks the user through a series of questions about the type or manufacturer of the wireless network access device. The representative's computer 214 takes this information and tries to identify information that may be used in the configuration of the voice controlled assistant 104.

In some implementations, the computer 214 may be linked to a set of servers 224(1), . . . , 224(F) that receive data entered by the representative 202 and processes the data in an effort to discover the SSID and/or access key. The servers 224(1)-(F) have computing resources of processors 226 and memory 228 to perform various tasks in support of the customer service representative 202. A few example functions are shown as applications stored in the memory 228 and executed on the processors 226, including a searchable datastore of device specifications 230, a configuration module 232, and a DTMF generator 234.

As the user 112 describes the wireless access point device, the customer services representative 202 may query the device datastore 230 for possible configuration protocols. For each device, the datastore 230 may have a list of SSIDs and factory default access keys that may be discovered and tried during the configuration of the assistant 104. Once a combination is found, the configuration module 232 creates a programming sequence suitable to configure the assistant 104. The programming sequence includes the SSID and the access key. The DTMF generator 234 then generates a series of tones that encode the programming sequence. The tones are transmitted over the network 204 to the DTMF devices 206/208, which emit the tones for capture by the assistant 104. As above, these audibly emitted tones are deciphered and used to configure the assistant 104.

While the scenario in FIG. 2 is described as involving a human customer service representative, non-human solutions may be used to provide the customer service. For instance, a virtual agent or an automated IVR (interactive voice response) system may be used to interact with the user and guide him or her through the configuration process. That is, the virtual agent or IVR system may be programmed to request the configuration settings from the user or perform the look ups in an effort to find the SSID and access keys. In this manner, the remote systems are entirely automated, but able to remotely configure the voice controlled assistant.

Figure 3:
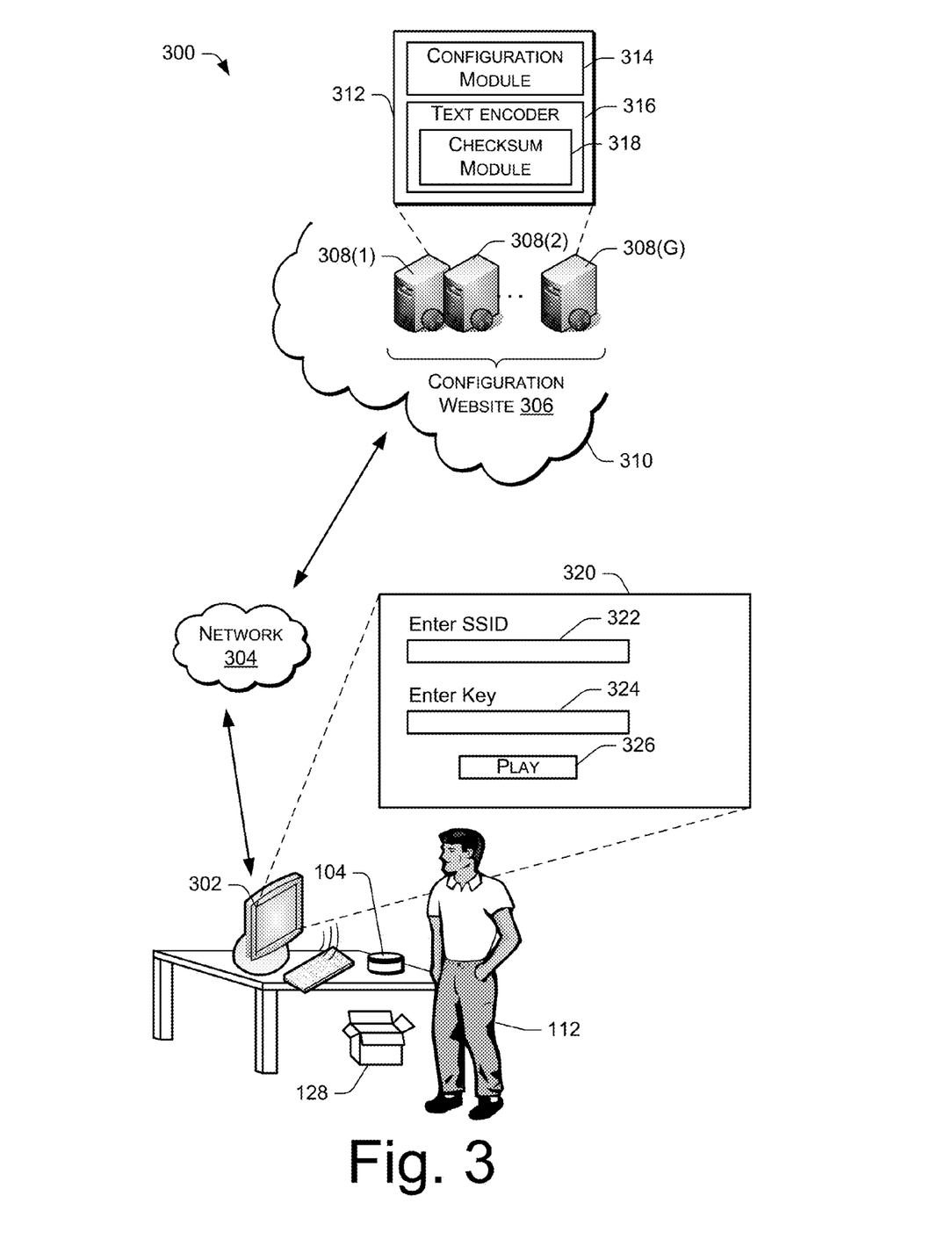
FIG. 3 shows a third implementation for configuring the voice controlled assistant.

FIG. 3 shows a third implementation 300 for configuring the voice controlled assistant 104, this time with the aid of a website. Suppose the user removes the voice controlled assistant 104 from its packaging 128 and sets it on the table 110 near a client computer 302. The user 112 may use the computer 302 to access, via a network 304, a remote configuration website 306 hosted on one or more servers 308(1), 308(2), . . . , 308(G). The computer 302 is representative of any number of computing devices including, for example, desktop computers, laptops, tablets, smart phones, personal digital assistants, cable boxes, set top boxes, and so forth. The website 306 may or may not be part of cloud services 310, such as services 106 described above with respect to FIG. 1.

The website hosts a configuration application 312 that is stored in memory and executed on the processors of the servers 308(1)-(G). The application 312 includes a configuration UI 314 and an encoder 316 to encode a text string or other instruction sets to be sent to the computer 302. The encoder 316 may further include a checksum module 318 to compute a checksum on the data transmitted to ensure that the audio feed was not corrupted during transmission.

A client-side browser on the computer 302 may present a UI 320 served by the configuration website 306, which contains content supplied by the configuration UI module 314. In the illustration, the user is prompted to enter an SSID into entry field 322 and/or an access key into field 324. Once entered, the user can actuate the "Play" soft button 326, which sends the data to the website 306 for encoding by encoder 316. The data may be encoded in a number of ways. In one approach, the data may be encoded using a messaging protocol, such as Morse code. In another approach, the encoder generates a sequence of DTMF tones, as described above with respect to FIG. 2. In yet another example, the data is encoded from a text string into a human perceptible audio output. The checksum module 318 may compute a checksum across the encoded data (e.g., code, sequence of tones, audio file, etc.) prior to transmission.

When received at the computer, encoded data is audibly played from the computer's speakers for detection by the voice controlled assistant 104. That is, the Morse code, tones, or human perceptible audio output is emitted from the computer and picked up by the assistant 104 to configure the assistant with its network settings. In some cases, the data may be emitted more than one time to ensure that the assistant 104 captures it appropriately. The checksum may be used to ensure that the full data has been successfully transferred.

In some cases, the user 112 may not know the SSID and/or access key. In this situation, the website 306 may try to intelligently determine the settings. For instance, the website may evaluate the home network and identify a gateway. Wireless providers often publish default passwords for use as access keys, and these may be tried until one is found to work. Alternatively, the wireless gateway may have the access key, and the website 306 may try to log in and retrieve the access key. In still another case, the computer 302 may already store the configuration settings for the user's website. The computer 302 may also have a previously established trusted relationship with the website 306 that facilitates a trusted conveyance of the SSID and access key to the website 306. For instance, certain operating systems (e.g., Microsoft® Windows® 7) may establish trusted relationships with select cloud services and in this implementation, such an operating system is installed and executing on the computer 302. Once the website 306 has extracted the SSID and access key, the website can remotely configure the voice controlled assistant.

Once configured, the voice controlled assistant 104 may emit a signal (e.g., a beep, or sequence of notes) or audio command (e.g., "configuration is complete") informing the user 112 (and potentially the website 306) that the configuration is complete and successful. The assistant is now ready for use, and can facilitate user access to resources available on the web or private networks by responding to voice commands given by the user.

In some implementations, the voice controlled assistant 104 may be tracked from the time it is purchased. In the event that the user does not configure the device within a predefined time period (e.g., one week, one month, etc.), the customer service representative 202 and/or an automated website 306 may attempt to contact the user 112 to ensure that he is not having a problem with the configuration. A calendaring application may be used to monitor the time between purchase and configuration of the device. This proactive approach further aids in ensuring that the user sets up the device properly.

In the scenarios of FIGS. 2 and 3, the configuration settings were emitted through speakers of a device, such as the telephone or computer, and captured by the microphone of the voice controlled assistant. However, in other implementations, the assistant may be embodied without a built-in microphone. Instead, it is designed with an audio jack for coupling to an external microphone or headset. Thus, in this implementation, the external microphone functions to receive the audibly conveyed configuration signals for the voice controlled assistant.

Each of the scenarios described above is intended to enhance the user's out-of-box experience with a device having limited input/output capabilities. More particularly, the processes described herein enable user-friendly configuration of a voice controlled assistant that primarily, if not solely, relies on audio interactions.

Figure 4:
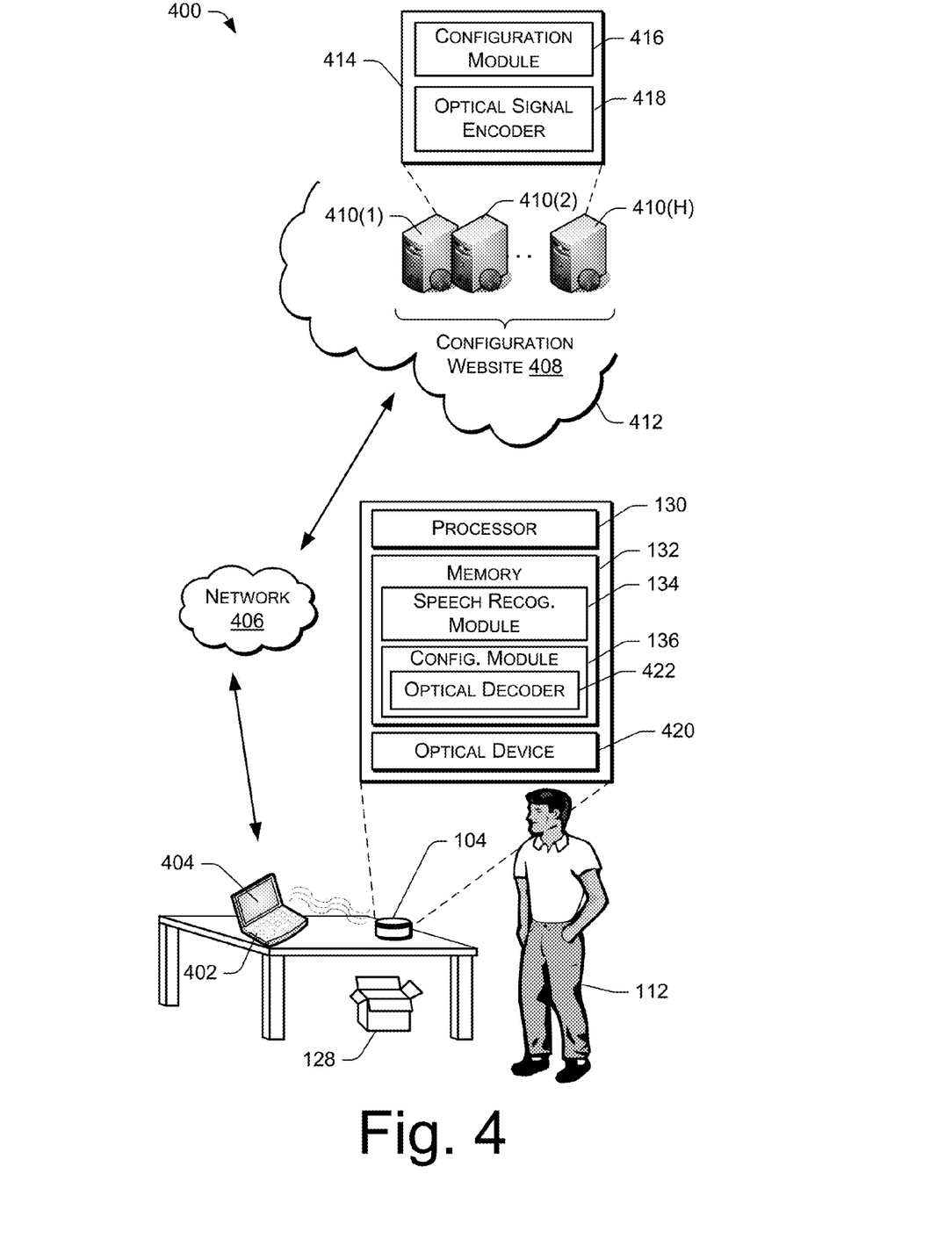
FIG. 4 shows a fourth implementation for configuring the voice controlled assistant through use of optical signals, as opposed to audible signals.

FIG. 4 shows a fourth implementation 400 for configuring the voice controlled assistant 104, in which optical signals, rather than audible signals, are used in the configuration process. As above, suppose the user removes the voice controlled assistant 104 from its packaging 128 and places the assistant on the table 110 near a computing device 402 with a display 404. In the illustrated implementation, the computer 402 is a laptop computer equipped with an LCD display 404. The computer 402 is representative of any number of computing devices including, for example, desktop computers, smart phones, personal digital assistants, and so forth. Essentially any computing device having an optical output component (e.g., display, individual light elements, etc.) to convey an optical signal may be used. The user 112 may use the computer 402 to access, via a network 406, a remote configuration website 408 hosted on one or more servers 410(1), 410(2), . . . , 410(H). The website 408 may or may not be part of cloud services 412, such as services 106 described above with respect to FIG. 1.

The website hosts a configuration application 414 that is stored in memory and executed on the processors of the servers 410(1)-(H). The application 414 includes a configuration module 416 and an optical signal encoder 418 to encode configuration settings and/or other instruction sets to be sent to the computer 402. The encoder 418 may further include a checksum module to compute a checksum on the data transmitted to ensure that the audio feed was not corrupted during transmission. In addition to check sum, other techniques to ensure full and accurate deliver of the configuration settings may be employed. Further, security protocols may be used to ensure that the data being optically transmitted is encrypted or otherwise secure.

The voice controlled assistant 104 includes the processor 130 and the memory 132, and is also equipped with an optical device 420 to detect optical signals conveyed from the computer 402. The optical device 420 may be implemented in many ways, including as a light sensor to sense changes in light emitted from the LCD 404, or as a detector to detect sequences or patterns of light pulses emitted from the LCD 404 or individual light emitting elements, or as a camera to capture images or patterns projected on the LCD 404. The optical device 420 may further be an IR receiver.

The assistant 104 also includes the speech recognition module 134 and configuration module 136, as described previously. In addition, the configuration module 136 includes an optical decoder 422 to receive and decode the optical signals detected at the optical device. The optical signals may be visible, such as a flashing light or visibly perceptible optical patterns, or may be invisible, such as infrared (IR) signals.

For discussion purposes, suppose the configuration website 408 obtains the SSID and access key to configure the voice controlled assistant 104. The SSID and access key may have been entered by the user 112 via a user interface, as described above with respect to FIG. 3, or conveyed by the user to a customer services representative (human or virtual), as described with respect to FIG. 2. Further the website 408 may automatically retrieve the SSID and access key for the user's wifi from the computer 402 if there is a trusted relationship.

Once the SSID and access key are known at the configuration website 408, the optical signal encoder 418 encodes the configuration settings into data to be transmitted to the laptop 402. The optical output may be generated in a number of ways. For instance, the display 404 of the computing device 402 may be used to depict images that can be captured by a camera or other optical device. In this case, the data containing the encoded configuration settings causes the display 404 to generate images that can be captured by the camera at the assistant 104. Alternatively, the display 404 may be controlled by the data to flash in a light sequence (e.g., Morse code) from a display or individual light elements to convey the configuration settings through an optical transmission. As yet another alternative, the computing device 402 may convey the configuration settings to the voice controlled assistant 104 via IR signals that are generated based on the data carrying the encoded configuration settings.

The optical signals are received by the optical device 420 at the laptop 402 and conveyed to the optical decoder 422 of the voice controlled assistant for decoding. The optically transmitted configuration settings, such as the SSID and access key, are extracted by the optical decoder 422 and used by the configuration module 136 to configure the assistant 104.

Once configured, the voice controlled assistant 104 may emit a signal (e.g., a beep, or sequence of notes) or audio command (e.g., "configuration is complete") informing the user 112 (and potentially the website 408) that the configuration is complete and successful. The assistant is now ready for use, and can facilitate user access to resources available on the web or private networks by responding to voice commands given by the user.

Illustrative Voice Controlled Assistant

Figure 5:
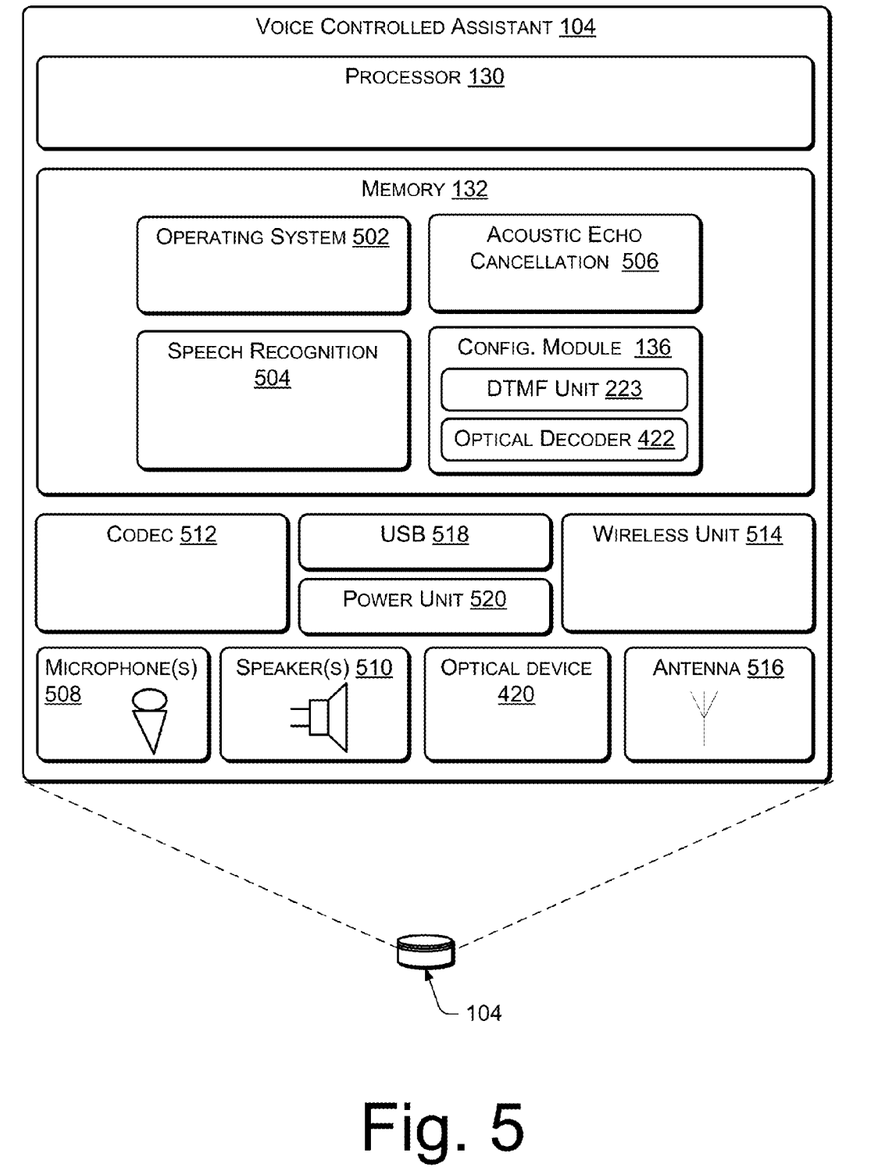
FIG. 5 shows a block diagram of selected functional components implemented in the voice controlled assistant of FIG. 1.

FIG. 5 shows selected functional components of the voice controlled assistant 104 in more detail. Generally, the voice controlled assistant 104 may be implemented as a standalone device that is relatively simple in terms of functional capabilities with limited input/output components, memory and processing capabilities. For instance, the voice controlled assistant 104 does not have a keyboard, keypad, or other form of mechanical input. Nor does it have a display or touch screen to facilitate visual presentation and user touch input. Instead, the assistant 104 may be implemented with the ability to receive and output audio, a network interface (wireless or wire-based), power, and limited processing/memory capabilities.

In the illustrated implementation, the voice controlled assistant 104 includes the processor 130 and memory 132. The memory 132 may include computer-readable storage media ("CRSM"), which may be any available physical media accessible by the processor 130 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 130.

Several modules such as instruction, datastores, and so forth may be stored within the memory 132 and configured to execute on the processor 130. An operating system module 502 is configured to manage hardware and services (e.g., wireless unit, USB, Codec) within and coupled to the assistant 104 for the benefit of other modules. A speech recognition module 504 and an acoustic echo cancellation module 506 provide some basic speech recognition functionality. In some implementations, this functionality may be limited to specific commands that perform fundamental tasks like waking up the device, configuring the device, cancelling an input, and the like. The amount of speech recognition capabilities implemented on the assistant 104 is an implementation detail, but the architecture described herein supports having some speech recognition at the local assistant 104 together with more expansive speech recognition at the cloud services 106.

The configuration module 136 may also be provided to assist in an automated initial configuration of the assistant (e.g., find wifi connection, enter key, etc.) to enhance the user's out-of-box experience, as well as reconfigure the device at any time in the future. In support the first configuration scenario described above with respect to FIG. 1, the configuration module 136 is capable of receiving the configuration settings by way of the user speaking the characters (e.g., numbers and/or letters). The configuration module 136 may confirm the settings with the user (e.g., by repeating them back) and stores the settings for use by the wireless unit (described below). In other implementations, like one to support the architecture 200 of FIG. 2, the configuration module 136 may include a DTMF unit 223 to receive and decipher the DTMF tones received during configuration. In still other implementations, like one to support the architecture 400 of FIG. 4, the configuration module 136 may include an optical decoder 422 to receive and decipher optically communicated signals received during configuration.

The voice controlled assistant 104 includes one or more microphones 508 to receive audio input, such as user voice input, and one or more speakers 510 to output audio sounds. A codec 512 is coupled to the microphone 508 and speaker 510 to encode and/or decode the audio signals. The codec may convert audio data between analog and digital formats. A user may interact with the assistant 104 by speaking to it, and the microphone 508 captures the user speech. The codec 512 encodes the user speech and transfers that audio data to other components. The assistant 104 can communicate back to the user by emitting audible statements through the speaker 510. In this manner, the user interacts with the voice controlled assistant simply through speech, without use of a keyboard or display common to other types of devices.

The voice controlled assistant 104 includes a wireless unit 514 coupled to an antenna 516 to facilitate a wireless connection to a network. The wireless unit 514 may implement one or more of various wireless technologies, such as wifi, Bluetooth, RF, and so on.

A USB port 518 may further be provided as part of the assistant 104 to facilitate a wired connection to a network, or a plug-in network device that communicates with other wireless networks. In addition to the USB port 518, or as an alternative thereto, other forms of wired connections may be employed, such as a broadband connection. A power unit 520 is further provided to distribute power to the various components on the assistant 104. The assistant 104 may optionally be equipped with an optical device 420, such as a camera, IR receiver, or some other mechanism for detecting and capturing optically transmitted signals. In one implementation, the optical device 420 may be a camera that captures a coded image, such as a QR code, and the optical decoder 422 may be configured to interpret such an image.

The voice controlled assistant 104 is designed to support audio interactions with the user, in the form of receiving voice commands (e.g., words, phrases, sentences, etc.) from the user and outputting audible feedback to the user. Accordingly, in the illustrated implementation, there are no input devices, such as navigation buttons, keypads, joysticks, keyboards, touch screens, and the like. Further there is no display for text or graphical output. In one implementation, the voice controlled assistant 104 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 104 does not use or need to use any input devices or displays.

Accordingly, the assistant 104 may be implemented as an aesthetically appealing device with smooth and rounded surfaces, with some apertures for passage of sound waves, and merely having a power cord and optionally a wired interface (e.g., broadband, USB, etc.). Once plugged in, the device may automatically self-configure, or with slight aid of the user, and be ready to use. As a result, the assistant 104 may be generally produced at a low cost. In other implementations, other I/O components may be added to this basic model, such as specialty buttons, a keypad, display, and the like.

Illustrative Process

FIGS. 6-9 show various processes of configuring the voice controlled assistant 104. The processes may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

In some figures, for purposes of describing example implementations, the blocks are arranged visually in columns beneath a voice controlled assistant 104 and the remote system to illustrate what parts of the architecture may perform these operations. That is, actions defined by blocks arranged beneath the voice controlled assistant may be performed by the assistant, and similarly, actions defined by blocks arranged beneath the command response system may be performed by the system.

Figure 6:
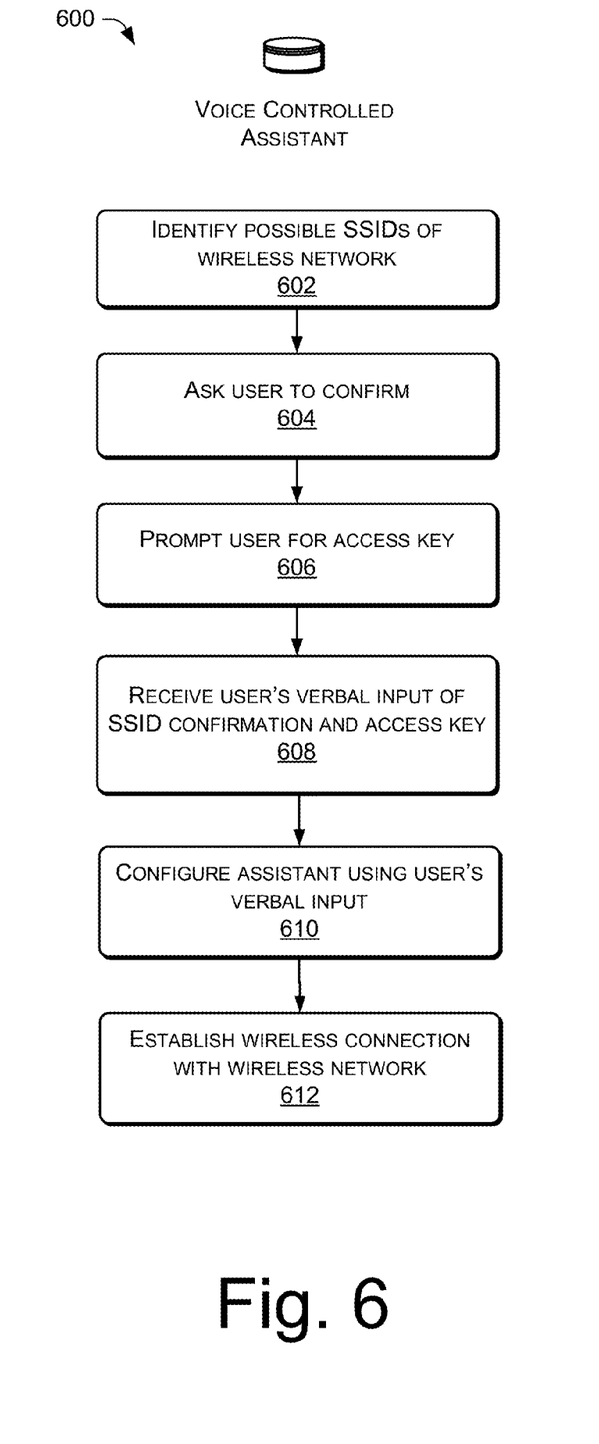
FIG. 6 presents a flow diagram showing an illustrative process of configuring the voice controlled assistant when the user recalls the configuration settings.

FIG. 6 shows a process 600 of configuring the voice controlled assistant 104 when the user recalls the configuration settings. This process 600 may be implemented, for example, using the architecture 100 of FIG. 1. More particularly, this process 600 may be implemented by the configuration unit 136 of the voice controlled assistant 104.

At 602, the voice controlled assistant 104 identifies possible SSIDs on a wireless network. After the assistant 104 is first removed from the packaging and powered on, the assistant scans for available networks. There may be one or more networks. When the user finds a wireless network, the assistant 104 audibly informs the user that the network(s) have been located. The assistant 104 may present a single network or a list of available networks.

At 604, the voice controlled assistant 104 asks the user to confirm which of the SSIDs represents the user's network, or a network that is otherwise available to be joined. The user may respond by affirming that he or she recognizes an SSID.

At 606, the voice controlled assistant 104 prompts the user for an access key. Assuming the user knows the key, the user may speak the characters (numbers and/or letters) in the key.

At 608, the voice controlled assistant 104 receives the user's verbal input of the SSID confirmation and access key. These configuration settings may be stored on the device.

At 610, the assistant uses the configuration settings received verbally from the user to configure itself for access to the network with the SSID affirmed by the user. The SSID and associated access key are used by the assistant 104 to gain access to the network.

At 612, after the assistant is configured, it establishes a wireless connection with the network. From that point forward, the user may access resources available over the network through verbal interactions with the voice controlled assistant.

Figure 7:
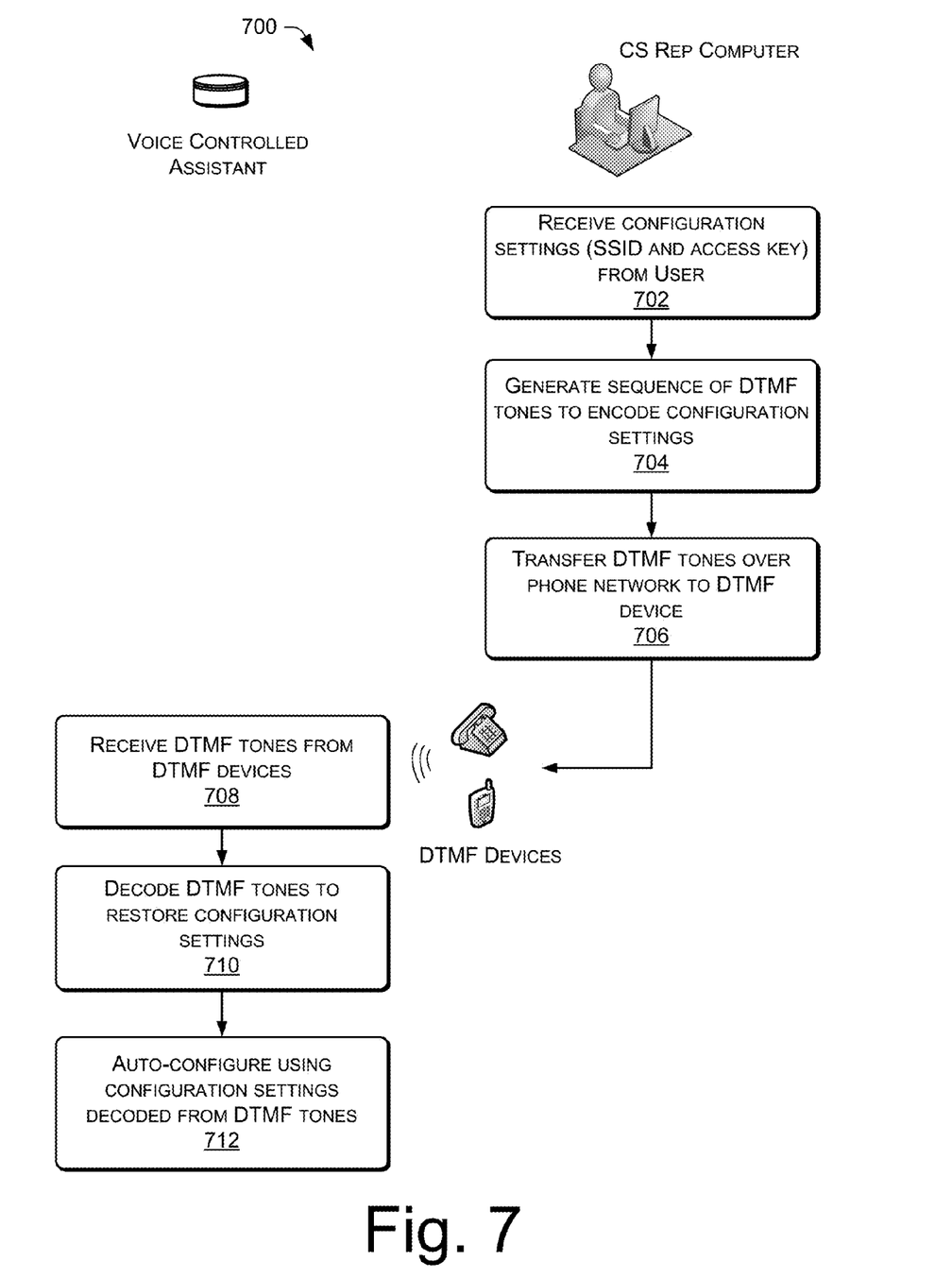
FIG. 7 is a flow diagram of an example process of configuring the voice controlled assistant using DTMF tones conveyed from a customer service representative.

FIG. 7 shows an example process 700 of configuring the voice controlled assistant using DTMF tones conveyed from a customer service representative. As one example implementation, the process 700 may be implemented by architecture 200 in FIG. 2. In this process, the user contacts the customer service representative (or vice versa, per process 900 in FIG. 9) to seek assistance in configuring the voice controlled assistant 104. The blocks shown in this figure represent operations performed by the computing devices, including the customer service representative's computer and the voice controlled assistant.

At 702, a set of configuration settings are received at the customer service representative's computer. These settings may be entered by the customer service representative, via a UI 216, or as part of a work flow process at the customer service center. The settings include the SSID and the access key.

At 704, a sequence of DTMF tones is generated to encode the configuration settings. For example, computer takes the string of characters in the SSID and access key and generates a sequence of DTMF tones that encode effectively encode the character string. Additional predefined tone sequences may be used for a communication protocol, such as to communicate the start and stop of the character strings of the configuration settings.

At 706, the tones are transferred over the phone network to devices configured to handle the tones. In this example, the DTMF tones are sent to phones, such as a landline phone or a cellular phone. It is noted, however, that other messaging protocols (e.g., Morse code of a mono-tone signal) and other output devices (e.g., computers) may be used.

At 708, the voice controlled assistant 104 receives the DTMF tones from the DTMF devices. That is, the sounds emitted from the phones are audibly transmitted to and captured by the microphone of the assistant.

At 710, the assistant decodes the DTMF tones to restore the configuration settings. As one example, the assistant uses a DTMF unit 223 to decode the tone sequences and restore the characters in the SSID and access key.

At 712, the configuration settings decoded from the DTMF tones are used to automatically configure the voice controlled assistant. The SSID and access key are stored and maintained in memory on the device and employed to access the user's wifi network.

Figure 8:
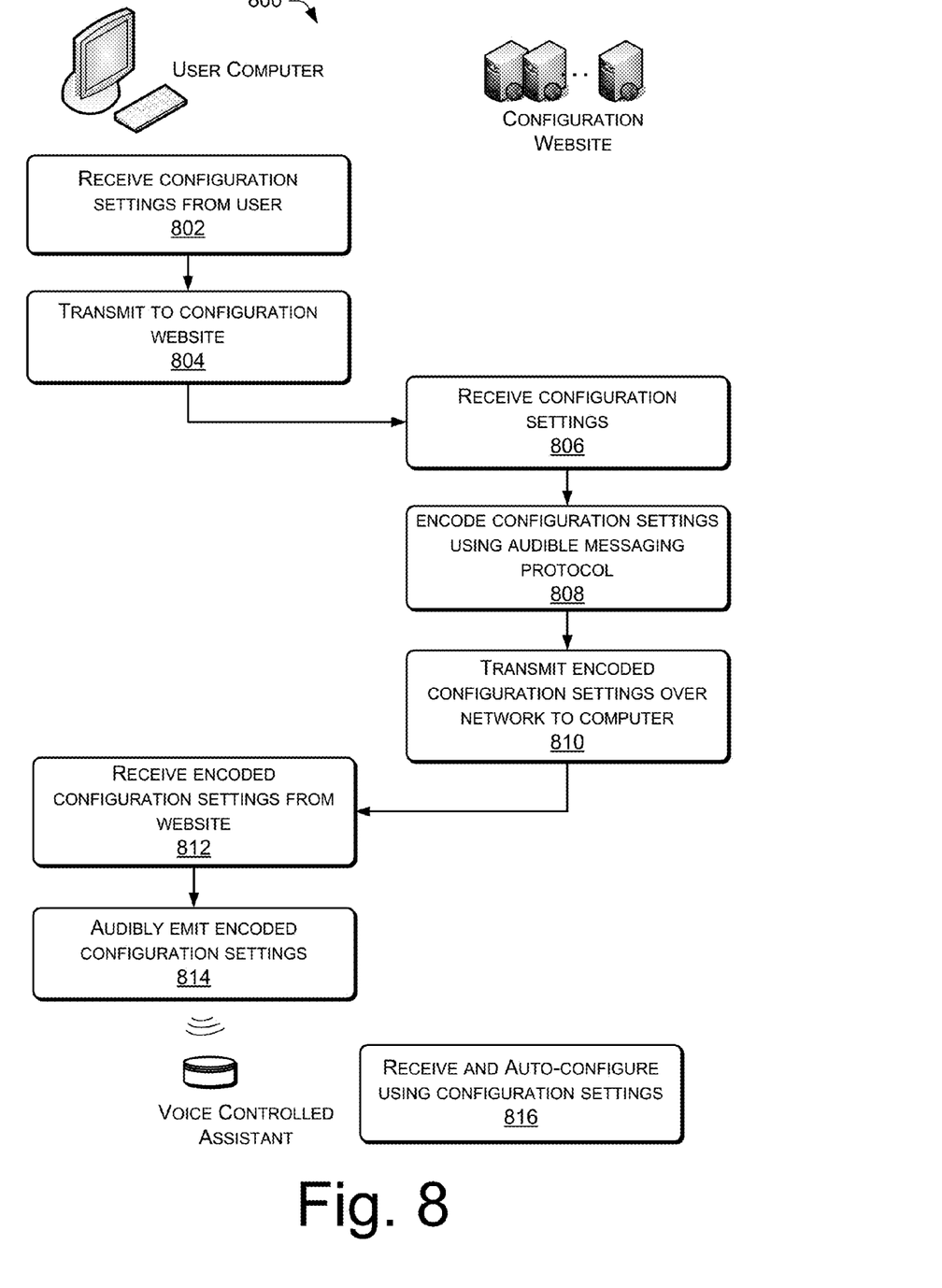
FIG. 8 presents a flow diagram showing an illustrative process of configuring the voice controlled assistant using an auto-configuration website.

FIG. 8 presents a flow diagram showing an illustrative process 800 of configuring the voice controlled assistant using an auto-configuration website. The architecture 300 of FIG. 3 is one example implementation that may be used to implement process 800.

At 802, configuration settings including the SSID and access key are received at the user computer. As shown in FIG. 3, this may be accomplished by the user entering the SSID and access key via a user interface 320.

At 804, the configuration settings are transmitted to a configuration website remote from the user computer. At 806, the configuration settings are received at the configuration website.

At 808, the configuration website encodes the configuration settings using an audible messaging protocol. Examples of such protocols may be mono-tone coded sequences (e.g., Morse code) or multi-tone code sequences (e.g., DTMF tones) or other techniques that convey information through sound.

At 810, the encoded configuration settings are transmitted over the network to the user computer. At 812, the encoded configuration settings are received at the user computer.

At 814, the encoded configuration settings are audibly emitted from the computer's speaker. In this manner, the settings are carried by audible sound waves to the voice controlled assistant.

At 816, the configuration settings are received by the assistant's microphone or an external microphone connected to the assistant and used to automatically configure the voice controlled assistant. The SSID and access key are stored and maintained in memory on the assistant and employed to access the user's wifi network.

Figure 9:
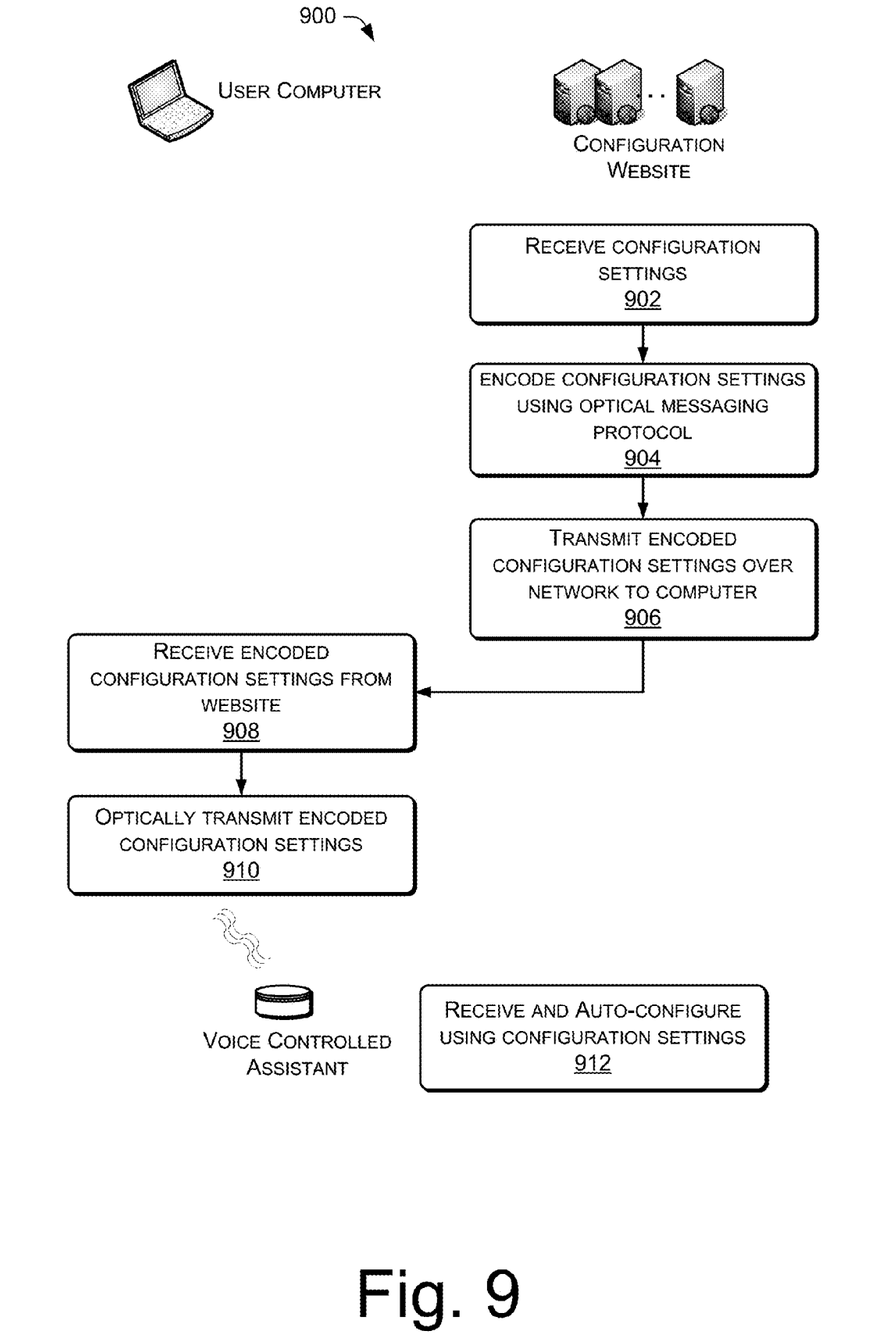
FIG. 9 is a flow diagram showing an example process of configuring the voice controlled assistant using optically transmitted configuration settings.

FIG. 9 shows an illustrative process 900 of configuring the voice controlled assistant using optically transmitted configuration settings. The architecture 400 of FIG. 4 is one example implementation that may be used to implement process 900.

At 902, configuration settings including the SSID and access key are provided to the configuration website. This may be accomplished in many ways including, for example, by the user entering the SSID and access key via a user interface 320 of the computer (e.g., FIG. 3), or by the user talking to a customer services representative (human or virtual) who then enters the information (e.g., FIG. 2).

At 904, the configuration website encodes the configuration settings into data that can be used to generate optical signals using an optical messaging protocol. Examples of such protocols may include light sequences (e.g., optical version of Morse code), light patterns or color schemes, or images that can be depicted on a display, or other techniques that convey information using light (whether humanly visible or invisible).

At 906, the encoded configuration settings are transmitted over the network to the user computer. Additional information may be encoded with the configuration settings, such as checksum data or other data to ensure data integrity. Additionally, the encoded configuration settings may be encrypted or otherwise secured for transmission. At 908, the encoded configuration settings are received at the user computer.

At 910, the encoded configuration settings are optically transmitted from the computer display or other light emitting element of the computer. In this manner, the settings are carried by light waves to the voice controlled assistant.

At 912, the optically transmitted configuration settings are received by the assistant's optical device and decoded to recover the settings. The configuration settings are then used to automatically configure the voice controlled assistant. The SSID and access key are stored and maintained in memory on the assistant and employed to access the user's wife network.

Figure 10:
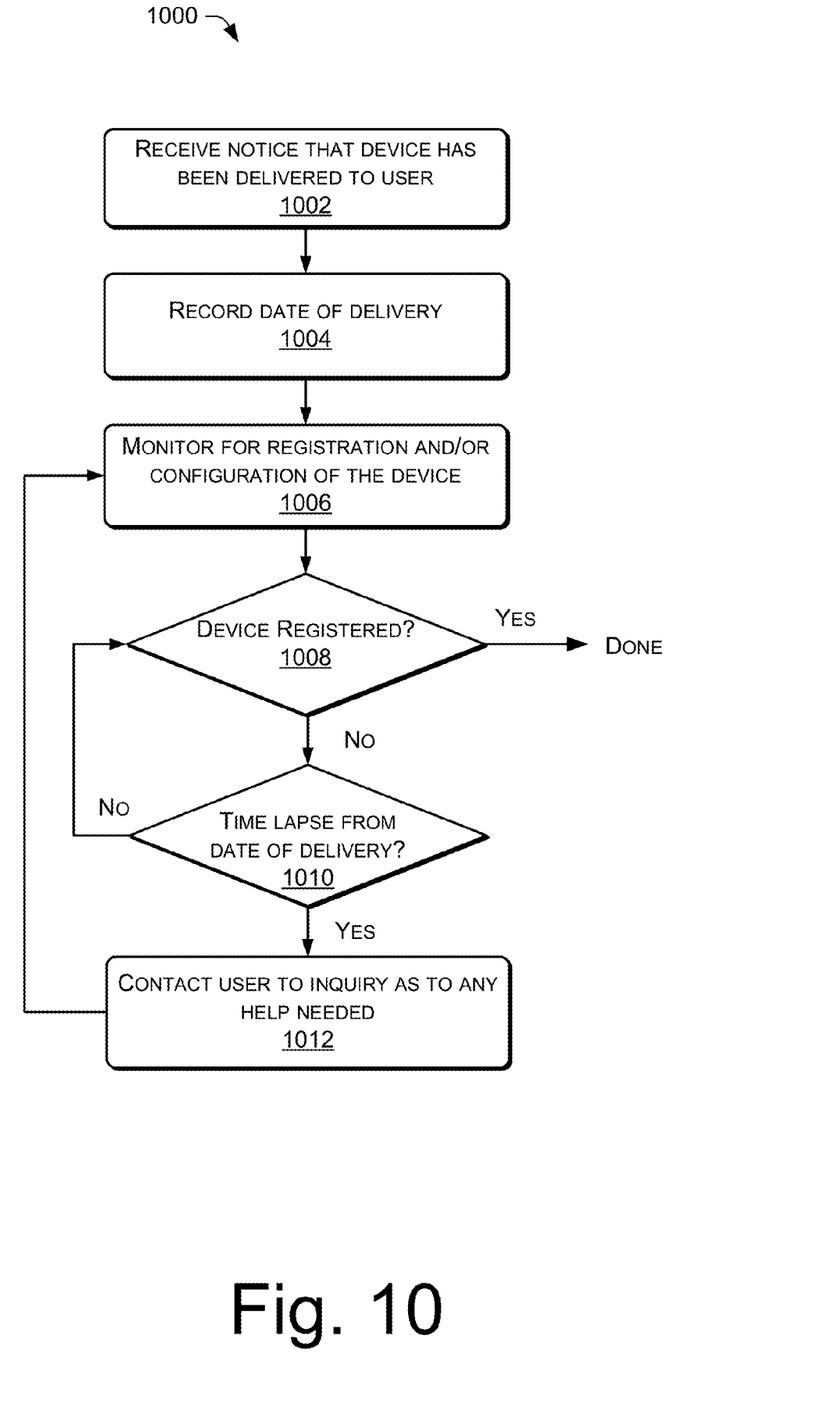
FIG. 10 is a flow diagram of an example process of proactively assisting the user in configuring the voice controlled assistant.

FIG. 10 shows an example process 1000 of proactively assisting the user in configuring the voice controlled assistant. This process 1000 may be implemented, for example, by the computer associated with the command response system (e.g., a server executing the calendar application 138), or a computer associated with customer service representative, or by the configuration website.

At 1002, a notice that a configurable device (e.g., the voice controlled assistant) has been delivered to the intended user.

At 1004, the delivery date/time are recorded. In one implementation, a calendaring system may be used to record this delivery information.

At 1006, a task is initiated to monitor for any registration and/or configuration of the device. The monitoring task is scheduled to run for a predetermined time period, such as one or two weeks.

At 1008, it is determined whether the device has been registered and/or configured. If so (i.e., the "yes" branch from 1008), the process 1000 is completed. If not (i.e., the "no" branch from 1008), it is determined whether the predefined time period since delivery has lapsed, at 1010. If no (i.e., the "no" branch from 1010), the process continues to monitor for registration and/or configuration. On the other hand, if the time has lapsed (i.e., the "yes" branch from 1010), the user is proactively contacted to see if any configuration assistance is needed, at 1012. The contact may be accomplished in many ways, such as by email, text messaging, a phone call, physical letter, and so forth. The contact may be originated by a human representative or auto-generated through an automated computerized system.

In this way, the user who may be struggling to configure a new electronic device, particularly one that is primarily voice operated, may be afforded proactive customer service in the hope of enhancing user experience.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a computing system remote from, and not in physical proximity to, a voice controlled assistant, the computing system configured to:
   determine that a period of time has lapsed since delivery of the voice controlled assistant;
   determine that the voice controlled assistant has yet to initiate configuration;
   generate a notice based at least on the voice controlled assistant yet to initiate the configuration;
   encode configuration settings as a sequence of sounds for emission within physical proximity of the voice controlled assistant; and
   transfer data representative of the sequence of sounds to a device to emit the sequence of sounds in physical proximity to the voice controlled assistant; and
   the voice controlled assistant having at least one microphone and at least one speaker to facilitate audio interactions with a user, the voice controlled assistant further having a wireless network interface to communicate with a wireless network after the voice controlled assistant is configured with the configuration settings to access the wireless network, the voice controlled assistant capturing the sequence of sounds through the microphone and having a decoder to decode the sequence of sounds to recover the configuration settings.

2. The system of claim 1, wherein the voice controlled assistant is implemented without an input keypad and a display.

3. The system of claim 1, wherein the computing system encodes the sequence of sounds using an audible messaging protocol.

4. The system of claim 1, wherein the sequence of sounds comprises a series of dual-tone multi-frequency (DTMF) tones.

5. The system of claim 1, wherein the device comprises one or more of a computer, a landline phone, a cell phone, or a mobile computing device.

6. The system of claim 1, wherein the computing system transfers the sequence of sounds over a second network.

7. The system of claim 1, wherein the sequence of sounds comprises DTMF tones and the computing system transfers the DTMF tones over a telephone network or a cellular phone network to the device as a DTMF compatible device for emission.

8. A computer-implemented method comprising:
   under control of one or more computing devices configured with specific executable instructions,
   determining that a period of time has lapsed since delivery of a wireless device;
   determining that the wireless device has yet to initiate configuration;
   generating a notice based at least on the wireless device yet to initiate the configuration;
   receiving configuration settings, that when used by the wireless device, provide access to a wireless network, the one or more computing devices not in physical proximity to the wireless device;
   encoding the configuration settings as audio data to be used to generate a sequence of sounds; and
   transmitting the audio data to another device in physical proximity to the wireless device, the another device configured to audibly emit the sequence of sounds generated from the audio data to the wireless device.

9. The computer-implemented method of claim 8, wherein the configuration settings comprise an SSID and an access key.

10. The computer-implemented method of claim 8, wherein the sequence of sounds comprises one or more of dual-tone multi-frequency (DTMF) tones or an audible code sequence.

11. The computer-implemented method of claim 8, wherein receiving configuration settings comprises capturing the configuration settings entered via a user interface of the one or more computing devices separate from the wireless device.

12. The computer-implemented method of claim 8, further comprising causing the sequence of sounds to be audibly emitted through a speaker associated with the another device in physical proximity to the wireless device.

13. The computer-implemented method of claim 8, further comprising causing the sequence of sounds to be audibly emitted by the another device in physical proximity to the wireless device.

14. The computer-implemented method of claim 8, wherein the sequence of sounds comprises dual-tone multi-frequency (DTMF) tones; and
   further comprising transmitting the DTMF tones over at least one of a telephone network or a cellular network to a DTMF compatible device for emission to the wireless device.

15. A device comprising:
   one or more processors; and
   one or more computer-readable media storing instruction that, when executed by the one or more processor, cause the one or more processors to perform operations comprising:
   determining that a period of time has lapsed since delivery of a wireless device;

determining that the wireless device has yet to initiate configuration;

generating a notice based at least on the wireless device yet to initiate the configuration;

receiving configuration settings, that when used by the wireless device, provide access to a wireless network;

encoding the configuration settings as audio data to be used to generate a sequence of sounds; and transmitting the audio data to another device in physical proximity to the wireless device, the another device configured to audibly emit the sequence of sounds generated from the audio data to the wireless device.

16. The system of claim 15, wherein the configuration settings comprise an SSID and an access key.

17. The system of claim 15, wherein the sequence of sounds comprises one or more of dual-tone multi-frequency (DTMF) tones or an audible code sequence.

18. The system of claim 15, the system further comprising a user interface, and wherein receiving configuration settings comprises capturing the configuration settings entered via the user interface.

19. The system of claim 15, the operations further comprising causing the sequence of sounds to be audibly emitted through a speaker associated with the another device in physical proximity to the wireless device.

20. The system of claim 15, the operations further comprising causing the sequence of sounds to be audibly emitted by the another device in physical proximity to the wireless device.

\* \* \* \* \*